(12) United States Patent
Vanhee et al.

(10) Patent No.: US 12,184,157 B2
(45) Date of Patent: Dec. 31, 2024

(54) SYSTEMS FOR ELECTRIC MOTOR COOLING

(71) Applicant: Dana Automotive Systems Group, LLC, Maumee, OH (US)

(72) Inventors: Steven Vanhee, Hooglede (BE); Joachim Druant, Houthulst (BE); Thibault Devreese, Ghent (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 96 days.

(21) Appl. No.: 17/376,020

(22) Filed: Jul. 14, 2021

(65) Prior Publication Data

US 2023/0017636 A1 Jan. 19, 2023

(51) Int. Cl.
| | |
|---|---|
| *H02K 9/19* | (2006.01) |
| *H02K 1/20* | (2006.01) |
| *H02K 3/24* | (2006.01) |
| *H02K 5/20* | (2006.01) |

(52) U.S. Cl.
CPC ............... *H02K 9/19* (2013.01); *H02K 1/20* (2013.01); *H02K 3/24* (2013.01); *H02K 5/20* (2013.01)

(58) Field of Classification Search
CPC .................................. H02K 1/20; H02K 9/19
See application file for complete search history.

(56) References Cited

U.S. PATENT DOCUMENTS

| | | | | |
|---|---|---|---|---|
| 7,759,829 | B2 * | 7/2010 | Holter | H02K 7/003 |
| | | | | 310/216.121 |
| 8,492,952 | B2 | 7/2013 | Bradfield | |
| 8,519,577 | B2 | 8/2013 | Stiesdal | |
| 8,519,580 | B2 * | 8/2013 | Brandl | H02K 9/16 |
| | | | | 310/58 |
| 8,692,425 | B2 | 4/2014 | Creviston et al. | |
| 2003/0164651 | A1 | 9/2003 | Tornquist et al. | |
| 2009/0206687 | A1 | 8/2009 | Woody et al. | |
| 2009/0212649 | A1 | 8/2009 | Kingman et al. | |
| 2012/0286597 | A1 * | 11/2012 | Gundtoft | H02K 3/24 |
| | | | | 310/59 |
| 2013/0193786 | A1 * | 8/2013 | Cherney | H02K 9/19 |
| | | | | 310/54 |
| 2013/0293040 | A1 | 11/2013 | Chamberlin et al. | |
| 2014/0197701 | A1 | 7/2014 | Hossain et al. | |
| 2016/0118862 | A1 * | 4/2016 | Maki-Ontto | H02K 3/24 |
| | | | | 310/59 |

(Continued)

FOREIGN PATENT DOCUMENTS

| | | |
|---|---|---|
| EP | 0627804 A2 | 12/1994 |
| WO | 2012154423 A2 | 11/2012 |
| WO | 2016204670 A1 | 12/2016 |

OTHER PUBLICATIONS

Silwal, B. et al., "Assessment of Different Cooling Techniques for Reduced Mechanical Stress in the Windings of Electrical Machines," Energies, vol. 12, No. 10, May 2019, 18 pages.

*Primary Examiner* — Daniel C Puentes
*Assistant Examiner* — Minki Chang
(74) *Attorney, Agent, or Firm* — McCoy Russell LLP (57) ABSTRACT

Systems are provided for an electronic drive unit. In one example, the electronic drive unit comprises a cooling passage integrally arranged therein, wherein the cooling passage is sealed via laminations of the stator. The laminations are further shaped to jet oil from the cooling passage onto end-windings.

15 Claims, 5 Drawing Sheets

(56) References Cited

U.S. PATENT DOCUMENTS

| | | |
|---|---|---|
| 2019/0006914 A1 | 1/2019 | Graves et al. |
| 2019/0312488 A1 | 10/2019 | Latulipe et al. |
| 2020/0204044 A1 | 6/2020 | Lee et al. |
| 2021/0075274 A1 | 3/2021 | Druant et al. |
| 2021/0351641 A1* | 11/2021 | Dlala .................. H02K 9/19 |

* cited by examiner

SYSTEMS FOR ELECTRIC MOTOR COOLING

TECHNICAL FIELD

The present description relates generally to systems for cooling windings of an electric motor via jet nozzle features.

BACKGROUND AND SUMMARY

Vehicles may be equipped with electrical energy storage devices to decrease vehicular contributions to global warming. An electric motor may be configured to operate via the electrical energy, wherein the electric motor may drive one or more wheels of the vehicle. Like an engine, the electric motor may demand cooling during certain operating conditions.

An efficiency of the electric motor may be at least partially based on an efficiency of the cooling provided to the electric motor and its various components. Stator windings may represent one component in which previous examples of cooling may be insufficient. For example, jets may be configured to spray coolant toward the windings. However, coolant may not surround the windings for a long enough duration to provide the desired amount of cooling.

Other examples of addressing electric motor cooling include designs attempting to promote coolant flow toward the windings. One example approach is shown by Forsberg et al. in WO 2016204670. Therein, drip notches are shaped into a guiding member, wherein the drip notches direct coolant to protruding members of a rotor.

Another example approach is shown by Creviston et al. in U.S. Pat. No. 8,692,425. Therein, coolant apertures are arranged in a coolant jacket and directed to flow coolant to a stator end turn.

A further example approach is shown by Graves et al in U.S. 20190006914. Therein, a stator cooling ring encircles a stator with stator cooling channels. The stator cooling ring includes openings for directing coolant to opposite ends of a winding.

However, the inventors have identified some issues with the approaches described above. For example, the drip notches of Forsberg may not provide sufficient cooling to a winding, as a coolant spray pattern may be needed to provide a desired amount cooling. Furthermore, the design of Forsberg requires the addition of the guiding member ring, which adds to the cost and complexity of the design therein. Creviston and Graves may experience the same issues as Forsberg, in that cooling of the stator is not direct and a cooling jacket is arranged therein, which needs extra seals and increases a packaging size of the system.

In one example, the issues described above may be addressed by a system for an electric drive unit comprising a housing, a stator arranged within the housing including first end-windings and second end-windings, a cooling passage integrally arranged within the stator, and a stator lamination configured to seal the cooling passage, the stator lamination comprising one or more openings configured to jet coolant from the cooling passage to the first and second end-windings. In this way, laminations of the stator may seal the coolant channel, thereby decreasing a packaging size and complexity.

As one example, the one or more laminations of the electric motor shaping the feed channel and oil jets may be spaced away from portions of a stator to shape first and second portions of the feed channel. The one or more laminations may be in face-sharing contact with the stator at ends of the feed channel adjacent to the one or more oil jets to seal the feed channel such that coolant may exit the feed channel via only the oil jets. By doing this, a sealing interface via rings or other components may be removed, which may reduce a cost and a weight of the electric motor relative to the examples introduced above.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
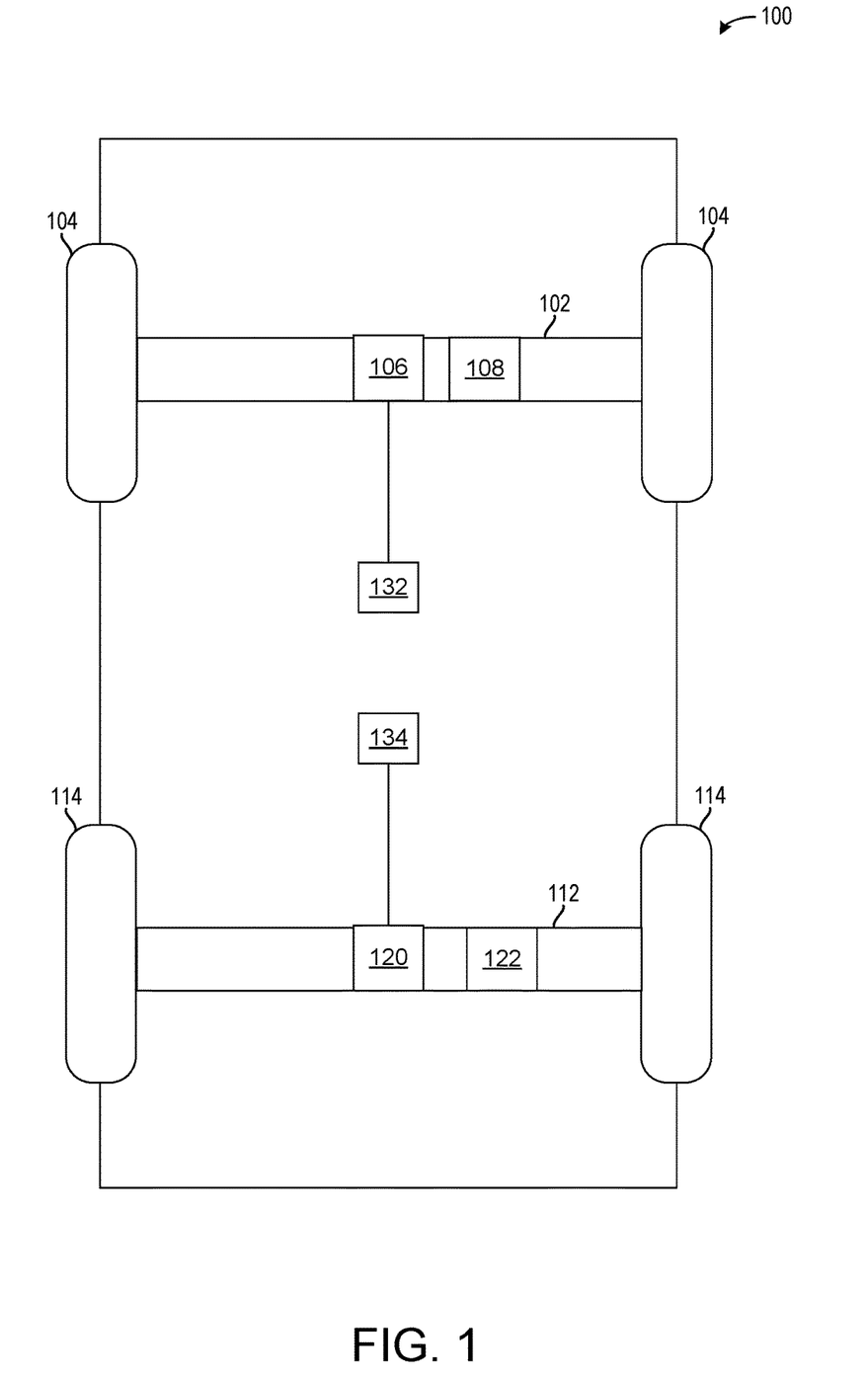
FIG. 1 shows a vehicle at least partially driven via an electric motor.
Figure 2:
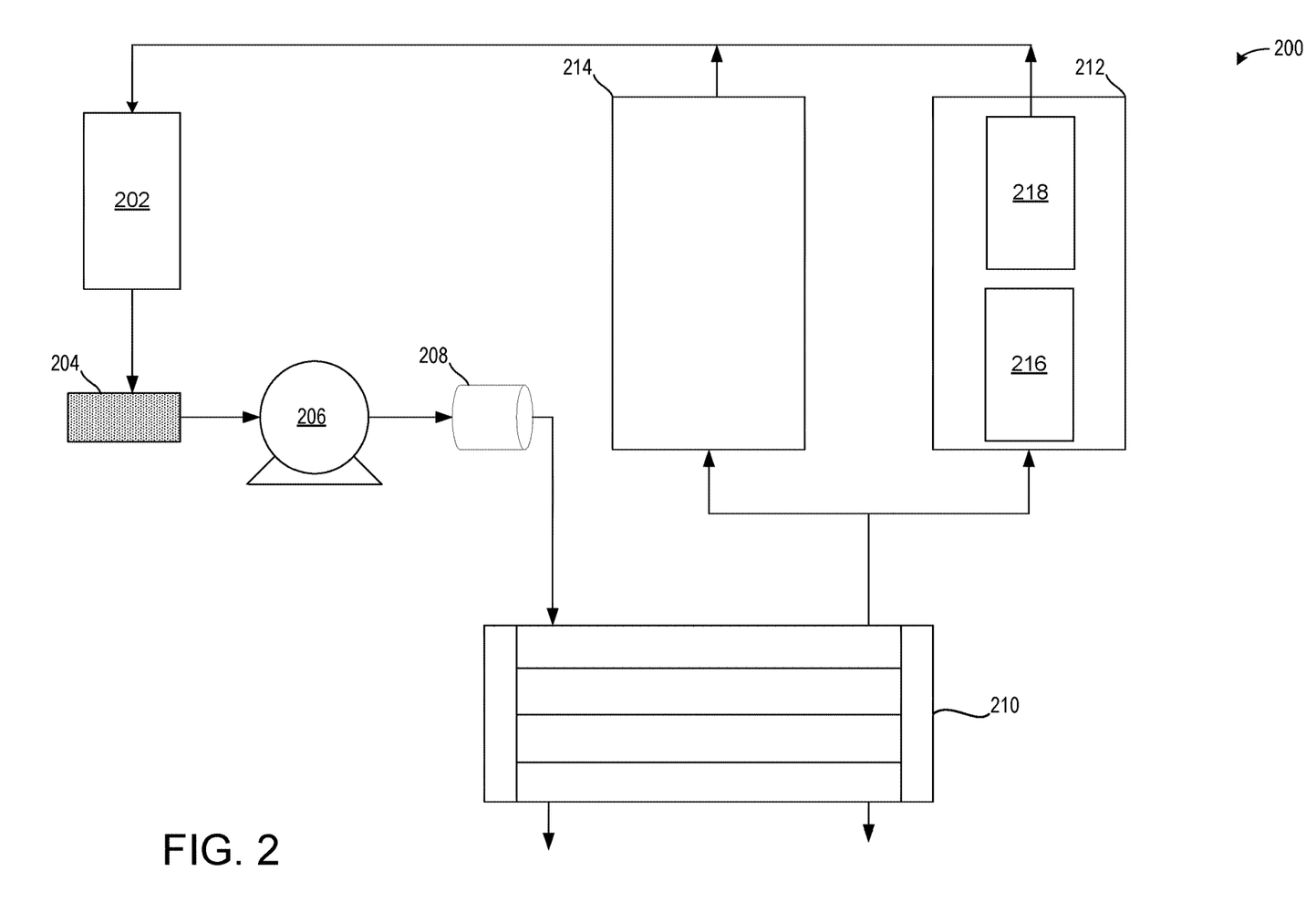
FIG. 2 shows a schematic diagram of a cooling system.
Figure 3:
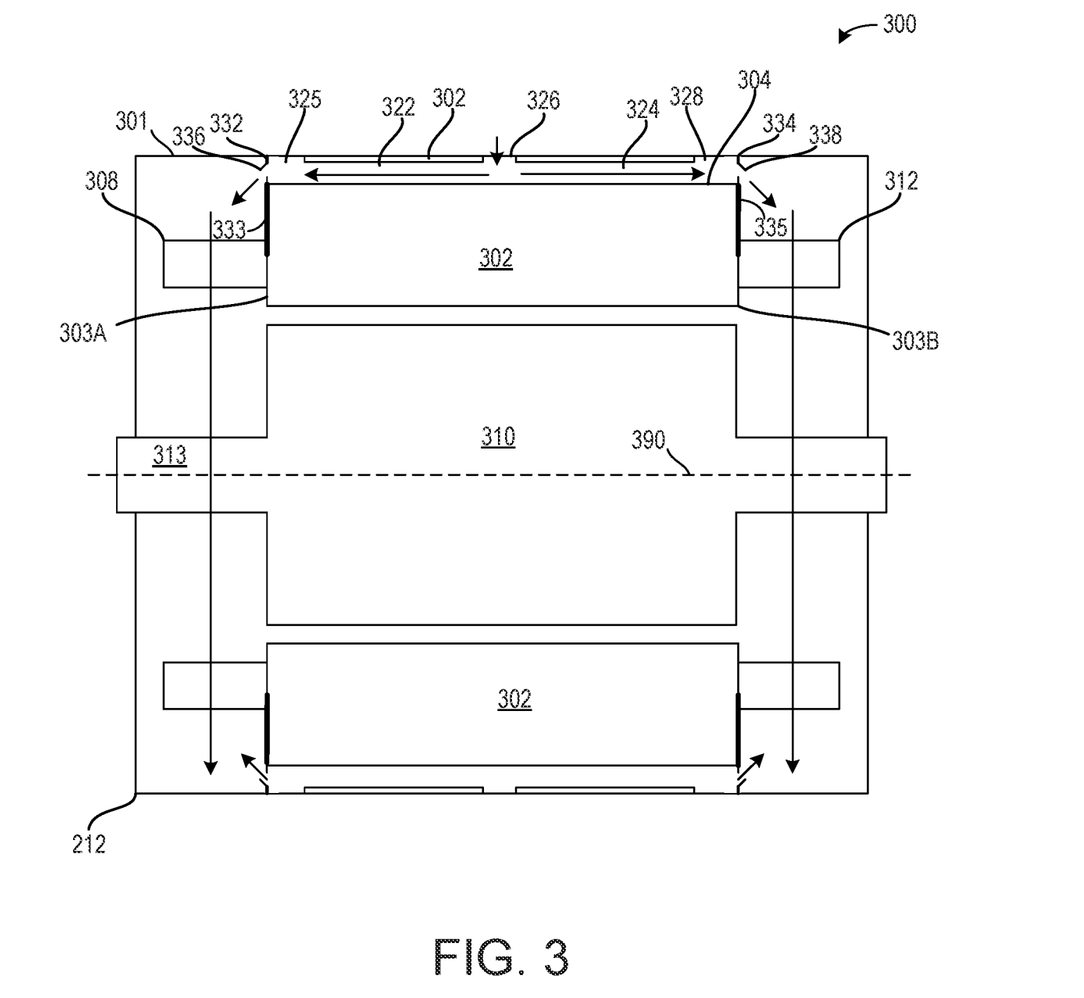
FIG. 3 shows a side sectional view of a drive unit comprising a cooling channel integrally arranged therein.
Figure 4:
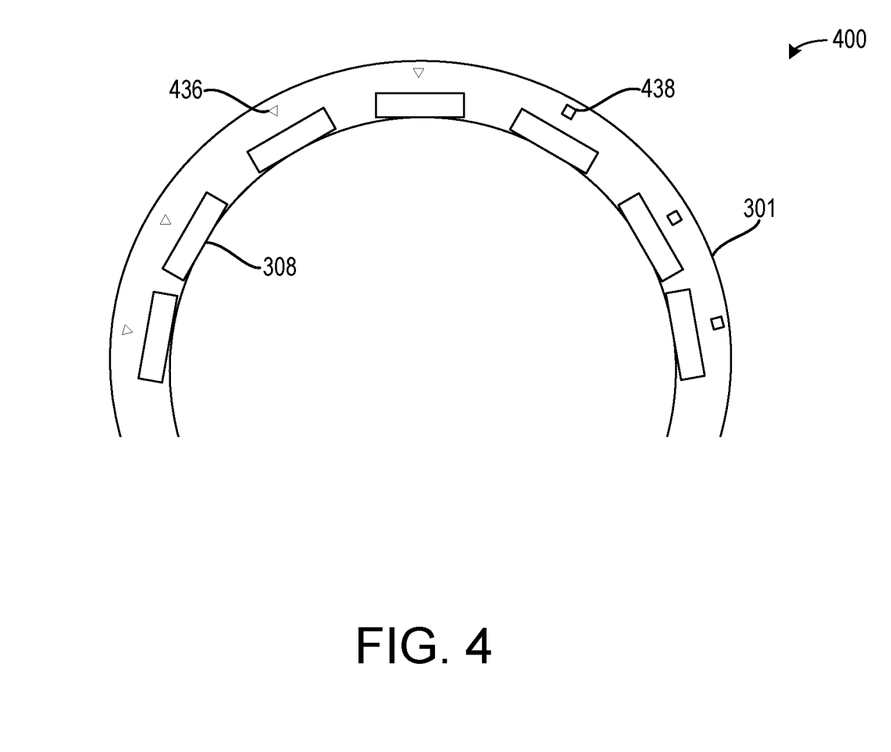
FIG. 4 shows an end sectional view of the drive unit illustrating different jet shapes of the cooling channel.
Figure 5A:
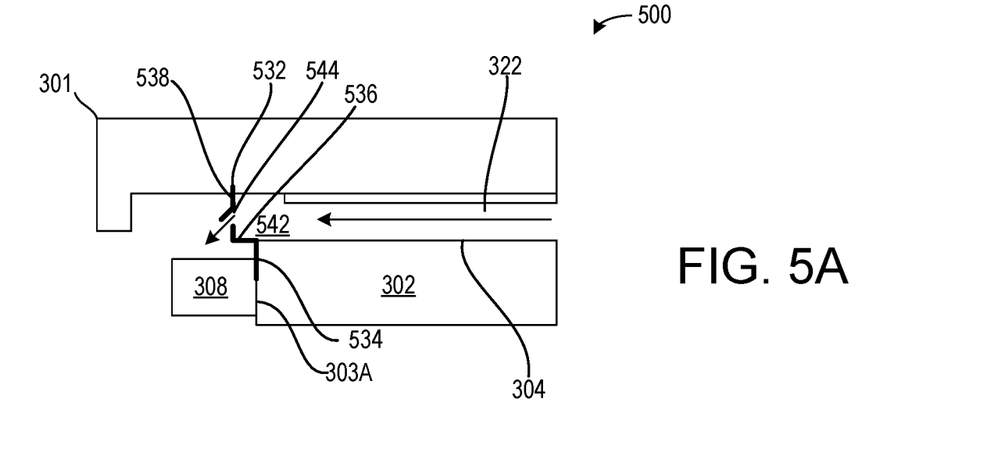
FIGS. 5A, 5B, and 5C show different embodiments of the cooling channel and jet nozzles.
Figure 5B:
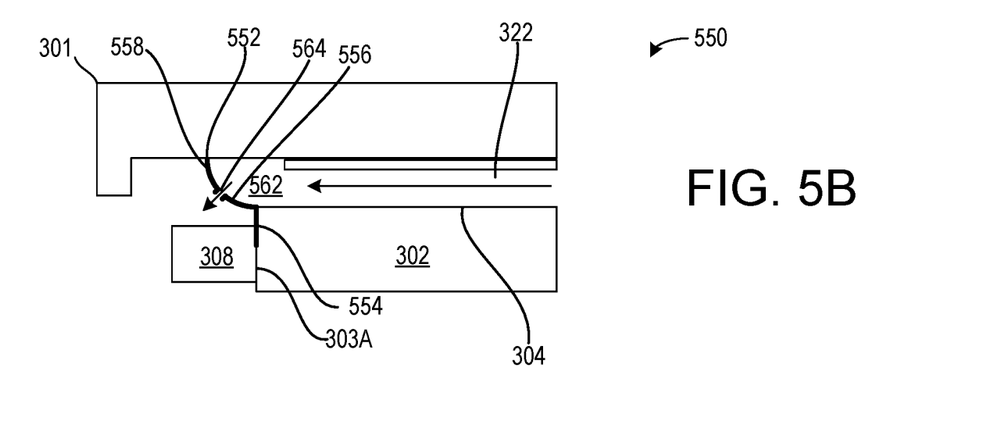
Figure 5C:
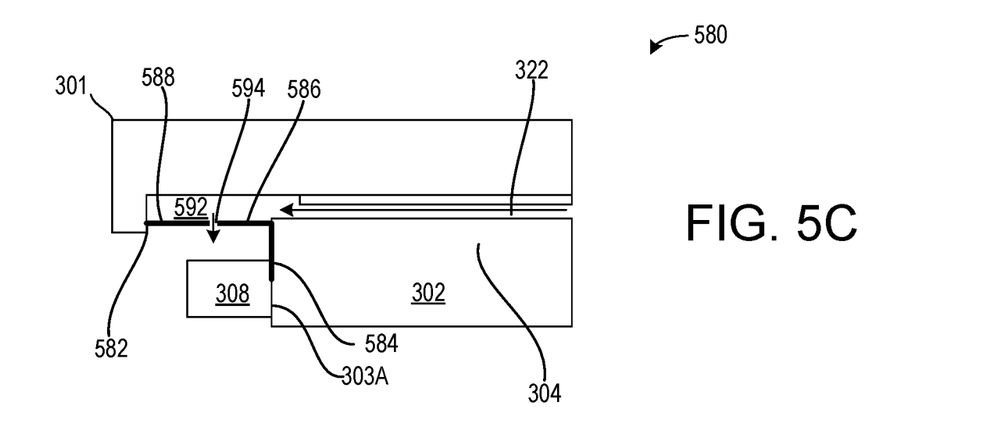

The following description relates to systems for a cooling arrangement for a drive unit. In one example, the drive unit is an electric motor of a vehicle, as illustrated in FIG. 1. The cooling arrangement may be an oil-based cooling arrangement fluidly coupled to the electric motor and a gear housing, as illustrated in FIG. 2. The cooling arrangement may be shaped and sealed via laminations of the stator, as shown in FIG. 3. The cooling arrangement may include openings and/or punch outs corresponding oil nozzle jets configured to spray oil onto winding ends of the stator. Various shapes of the oil nozzle jets being arranged within the electric motor are illustrated in FIG. 4. Different embodiments of the oil nozzle are illustrated in FIGS. 5A, 5B, and 5C.

FIGS. 1-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100.

The vehicle 100 may include one or more drive units. In one example, the one or more drive units include a first electric motor 106 arranged on the first shaft 102 and a second electric motor 120 arranged on the second shaft 112. The first electric motor 106 may be coupled to a first gear box 108 and a first electrical energy storage device 132. The second electric motor 120 may be coupled to a second gear box 122 and to a second electrical energy storage device 134. The first electric motor 106, in combination with the first gear box 108 may be configured to drive the first shaft 102, which may result in rotation of the first set of wheels 104. The second electric motor 120, in combination with the second gear box 122, may be configured to drive the second shaft 112, which may result in rotation of the second set of wheels 114. In some examples, additionally or alternatively, a single battery may be configured to supply electrical energy to each of the first electric motor 106 and the second electric motor 120.

The vehicle 100 is illustrated as an all-electric vehicle comprising one or more batteries for powering one or more electric motors to drive the vehicle. In one example, the vehicle 100 is an all-electric passenger vehicle. In some examples, additionally or alternatively, the vehicle 100 may be a hybrid vehicle including an engine configured to supply power to one or more of the first shaft 102 and the second shaft 112. The examples illustrated herein may be used with different types of electric vehicles including motor cycles, aircrafts, trucks, boats, train engines, and the like.

Turning now to FIG. 2, it shows a schematic diagram of a cooling and lubrication system 200 which may be arranged in the vehicle 100 of FIG. 1. The cooling and lubrication system may be configured to circulate a fluid, for example oil, through various components of an electric drive unit used in an electric passenger vehicle, for example. Though the embodiments described herein are in the context of an oil-based system, other fluids may be used. For example, any fluid which provides adequate lubrication, heat transfer and flow properties, for a particular application or pump size, may be used.

Lubricant may be arranged in an oil reservoir 202, which may include a sump or dry sump system (e.g. an oil reservoir external to the drive unit), and flow through a meshed filter 204 to an electric pump system 206. Oil pumped out of electric pump system 206 then passes through oil filter 208 and into heat exchanger 210. From heat exchanger 210, the oil then splits between a branch that leads to motor 212 and a branch that leads to gear box 214. For purposes of this description, however, only the oil flowing to motor 212 from heat exchanger 210 is described. Motor 212 may be identical to the first electric motor 106 and/or the second electric motor 120 of FIG. 1. Gear box 214 may be identical to the first gear box 108 and/or the second gear box 122 of FIG. 1.

With respect to oil flowing to motor 212, it first flows through a stator feed channel 216 and then to windings 218. From stator end-windings 218, the oil may return to oil reservoir 202. Herein, the flow of oil from the stator feed channel 216 to the windings 218 is described in greater detail.

Turning now to FIG. 3, it shows an embodiment 300 of a side-sectional view of the motor 212 of FIG. 2. As such, components previously introduced may be similarly numbered in this and subsequent figures. The motor 212 may include a stator 302. The stator 302 may comprise a hollow, cylindrical shape that surrounds an outer surface of a rotor 310 coupled to a rotor shaft 313. The stator may include a plurality of laminations forming a lamination stack. The lamination stack may include two sealing laminations 332 and 334 at the two ends. As illustrated, a gap, such as an air gap, may be arranged between the stator 302 and the rotor 310. The stator 302 may further include a first side surface 303A, a second side surface 303B, and an outer surface 304, distal to the portion of the stator 302 surrounding the rotor 310.

A cooling channel including a first cooling passage 322 and a second cooling passage 324 may be arranged between the stator 302 and a motor housing 301. In an alternate embodiment, the first cooling passage 322 and the second cooling passage 324 may be arranged within the stator yoke. As illustrated, the first and second cooling passages 322, 324 may be thermally coupled to the outer surface 304 of the stator 302. The cooling channel may include an inlet 326 configured to direct oil to the first cooling passage 322 and the second cooling passage 324. The first and second cooling passages 322, 324 extend in axially opposite directions, parallel to a central axis 390 of the rotor shaft 313. The first and second cooling passages 322, 324 may be integrally arranged in the motor 212, wherein the first and second cooling passages 322, 324 may be sealed via features of the stator 302 and the motor housing 301.

The first cooling passage 322 may include a first collection channel 325 arranged proximal to the first side surface 303A. The second cooling passage 324 may include a second collection channel 328 arranged proximal to the second side surface 303B. Each of the first collection channel 325 and the second collection channel 328 may be shaped via a first sealing lamination 332 and a second sealing lamination 334, respectively. The first and second stator sealing lamination 332, 334, may extend from first and second end-windings 308, 312 and to the motor housing 301. The first sealing lamination 332 may be the extreme (end) lamination at a first end of the lamination stack of the stator 302 proximal to the first end winding 308. Similarly, the second sealing lamination 334 may be the extreme (end) lamination at a second end of the lamination stack of the stator 302 proximal to the second end winding 312. In this way, the first sealing lamination and a second sealing lamination 332, 334 may be part of the stator lamination stack. Portions 333, 335 (shown in thickened lines) of the first sealing lamination and a second sealing lamination 332, 334 may be in face-sharing contact with the first side surface 303A and second side surface 303B respectively. In one example, the sealing laminations 332, 334 may seal the first and second cooling passages 322, 324, such that the cooling passages are integrally arranged in the motor 212. Integrally shaping the cooling passages in the motor 212 may include where seals and an additional spray ring are omitted unlike the prior art examples described above. Thus, the cooling passages may be sealed via the laminations, glue, and impregnation.

Although in this example, two sealing laminations are shown (one on each side), the sealing laminations 332, 334 may include more than one laminations on each side (more than a total of two sealing laminations). Said another way, instead of one lamination at each end of the stator lamination stack forming sealing laminations, a plurality of laminations at each end of the stator lamination stack may form the sealing laminations. The use of sealing multiple laminations may increase the strength of the channel and thus allow for higher pressures in the system. The first and second sealing laminations 332, 334 may include laminated magnetic steel used to effectively seal the cooling passage. Further, the first and second sealing laminations 333, 335 may include a plastic sealing lamination.

Since the lamination stacks may include openings and/or punch out oil nozzle features, the entire volume of oil may be routed through the nozzles without leaking between the laminations and housing. Details of the nozzle features are shown in FIGS. 4-5C.

The first end-winding 308 may extend axially from the first side surface 303A and the second end-winding 312 may extend axially from the second side surface 303B. Oil from the first collection channel 325 may spray onto the first end-winding 308 via a first opening 336 arranged in the first sealing lamination 332. Oil from the second collection channel 328 may spray onto the second end-winding 312 via a second opening 338 arranged in the second lamination stack 334. In the example of FIG. 3, the first opening 336 and the second opening 338 may be shaped via partial punch-outs in the first and second sealing laminations 332, 334, respectively. A material of the sealing laminations which is incompletely removed (e.g., still attached at one extreme end to the sealing laminations) may further guide the oil jet toward the corresponding winding. By doing this, a cooling of the first and second end-windings 308, 312 is enhanced.

Thus, in the example of FIG. 3, there are no additional components to guide the oil jetting from the coolant passages to the end-windings. A shape of the sealing laminations may be adjusted such that it extends from the end-windings to the motor housing, with openings arranged into the sealing laminations to direct oil from the coolant passages to the windings.

Turning now to FIG. 4, it shows an end sectional view 400 of the motor 212. The end sectional view 400 illustrates a profile of the openings shaped in the sealing laminations of the cooling passages adjacent to the first end-windings 308. First openings 436 may include a triangle shaped cross-section and second openings 438 may include a square shaped cross-section. Additionally or alternatively, the openings may be shaped to include rectangular, diamond-shaped, trapezoid-shaped, oval-shaped, circle-shaped, pentagon-shaped and like profiles.

As illustrated, a portion of the first end-windings 308 may receive oil from the first openings 436 and a remaining portion may receive oil from the second openings 438. The differently shaped openings may provide different oil spray patterns to provide different cooling profiles to the first end-windings 308. In one example, the first openings 436 may provide a more narrow spray pattern and the second openings 438 may provide a wider spray pattern. Thus, the cooling provided by the first openings 436 may be greater along a central region of the winding while the second openings 438 may provide a more uniform cooling across an entire width of the first end-windings. By doing this, a cooling of an entirety of the first end-windings may be achieved.

In some examples, openings opposite the first and second openings 436, 438 may be identically or differently shaped. That is to say, corresponding openings adjacent to the second end-windings (e.g., second end-winding 312 of FIG. 3) may be shaped identically or differently to the openings adjacent to the first end-windings 308. The position of the different openings may be selected such that the jet cooling on the end winding is improved such that all parts of the end winding are wetted. In this example, a concentrated winding is shown and one opening per end winding may provide desired coolant flow. In another example, for distributed windings more jets may be included. Overall, the shapes of the openings are configured to generate an effective coolant jet.

Turning now to FIG. 5A, it shows a first embodiment 500 of a cooling arrangement including the first cooling passage 322 of the stator 302. A first sealing lamination 532 may shape a portion of the first cooling passage 322 adjacent to the first side surface 303A of the stator 302. The first lamination sealing 532 may include a first portion 534 in face-sharing contact with the first side surface 303A and the motor housing 301. More specifically, in the example of FIG. 5A, the first portion 534 is sandwiched between the first end-winding 308 and the first side surface 303A at a first extreme end and physically coupled to the motor housing 301 at a second extreme end. In one example, the first sealing lamination 532 may extend into a portion of the motor housing 301.

The first sealing lamination stack 532 includes the first portion 534, a second portion 536, and a third portion 538. The first portion 534 may extend in a direction normal to a direction of oil flow in the first coolant passage 322. In one example, the first portion 534 corresponds to the portion of the first sealing lamination 532 in face-sharing contact with the first side surface 303A. The second portion 536 may extend in a direction normal to the first portion 534 and the first side surface 303A and parallel to the direction of oil flow in the first coolant passage 322. The third portion 538 may extend in a direction normal to the direction of oil flow in the first coolant passage 322 and the second portion 536.

A collection channel 542 may be shaped by the second portion 536 and the third portion 538. The collection channel 542 may correspond to a blockage in the oil flow at which oil may collect (e.g., accumulate). The third portion 538 may further include an opening 544, through which oil from the collection channel 542 may be expelled toward the first end-winding 308. By locating the collection channel 542 proximally to the opening 544, sprays of oil from the opening 544 may be more consistent and uniform.

The opening 544 may be shaped via a punch-out in the third portion 538. As an example, if the opening 544 is a square, only three sides of the square are punched. The remaining one side of the square is still connected to the lamination. The punched square may then be bent to form an oil-guidance feature. In the opening 544 with a party punched lamination, the oil is guided diagonally downward. In one example, the punch-out segment of the third portion 538 may be angled to adjust an angle of the oil jet from the opening 544 to the first end-winding 308. In this way, the opening 544 may be easily customizable based on a desired spray pattern.

Turning now to FIG. 5B, it shows a second embodiment 550 of a cooling arrangement including the first cooling passage 322 of the stator 302. The second embodiment 550 may be differentiated from the first embodiment 500 in that a shape of a second portion 556 and a third portion 558 may differ from a shape of the second portion 536 and the third portion 538 of FIG. 5A. Thus, a first portion 554 of a first sealing lamination 552 may be shaped similarly to the first portion 534 of the first sealing lamination 532 of FIG. 5A.

In one example, the second portion 556 and the third portion 558 may include a curved shape. In one example, the second portion 556 and the third portion 558 may shape a collection channel 562 in a quarter circle shape. An opening 564 may expel oil from the collection channel 562 toward the first end-winding 308.

Turning now to FIG. 5C, it shows a third embodiment 580 of a cooling arrangement including the first cooling passage 322 of the stator 302. The third embodiment 580 may be differentiated from the first embodiment 500 in that a shape of a second portion 586 and a third portion 588 of the first sealing lamination 582 may differ from a shape of the second portion 536 and the third portion 538 of FIG. 5A. A first portion 584 of the first sealing lamination 582 may be identically shaped to the first portion 534 of the first lamination 532 of FIG. 5A.

In one example, the second portion 586 and the third portion 588 may include a linear shape parallel to the direction of oil flow through the first coolant passage 322. The third portion 588 may contact a portion of the motor housing 301 axially distal to the stator 302 and the first end-winding 308. In one example, the second portion 586 and the third portion 588 may shape a collection channel 592 in a rectangle shape. An opening 594 may expel oil from the collection channel 592 toward the first end-winding 308. In one example, an angle of the spray from the opening 594 may be normal to the direction of oil flow and greater than the angle of the sprays of FIGS. 5A and 5B.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an electric drive unit comprising a housing;
a stator arranged within the housing including first end-windings and second end-windings;
one or more cooling passages integrally arranged within the stator; and
sealing laminations of a stator lamination stack configured to seal the cooling passage and shape a collection channel thereof, the sealing laminations comprising only a single opening per end-winding, wherein for each of the end-windings, the single opening is positioned radially between the end-winding and an outer circumference of the housing and is configured to jet coolant from the cooling passage to the first and second end-windings, the sealing laminations are at ends of the stator lamination stack, one end of the sealing laminations sandwiched between a first end-winding of the first end-windings and a side surface of the stator, and another end of the sealing laminations is in face-sharing contact with the housing at a same end of the stator lamination stack, the sealing laminations comprising an extreme end lamination of the stator lamination stack;
wherein the single opening is configured as a partial punch-out in the sealing laminations, wherein the partial punch-out is attached at one extreme end to the sealing laminations, and wherein the partial punch-out is configured as a coolant guidance feature to guide coolant from the single opening to the end-windings.

2. The system of claim 1, wherein the opening includes one of a triangular cross-section, a square cross-section, or a rectangular cross-section.

3. The system of claim 1, wherein the opening sprays coolant in a direction angled to a direction of coolant travel through the cooling passage.

4. The system of claim 1, wherein the opening sprays coolant in a direction normal to a direction of coolant travel through the cooling passage.

5. The system of claim 1, wherein neighboring openings are differently shaped.

6. The system of claim 1, wherein the stator laminations stack further shapes the collection channel configured to be fluidly coupled to the cooling passage, and wherein the opening expels coolant from only the collection channel.

7. An electronic drive unit, comprising:
a housing;
a stator arranged in the housing and comprising a plurality of cooling passages;
sealing laminations sandwiched between a first end-winding and a second end-winding and side surfaces arranged at opposite axial ends of the stator, wherein the sealing laminations are further physically coupled to the housing; wherein
the sealing laminations seal the cooling passage and comprises a collection channel at each of the opposite axial ends of the stator, the collection channel extending away from a side surface of the stator toward the housing, wherein cooling fluid collects in the collection channel and is jetted through an opening of the sealing laminations toward the first end-winding and the second end-winding, and wherein the collection channel is shaped via portions of the sealing lamination, the sealing lamination in face-sharing contact with the housing and sandwiched between an end-winding and the stator,
the sealing laminations comprise only a single opening per end-winding, and, for each of the end-windings, the single opening is positioned radially between the end-winding and an outer circumference of the housing and is configured to jet coolant from the cooling passage to the first and second end-windings, and
the collection channel is configured to hold the cooling fluid in a space between and directly contacting the stator and the housing.

8. The electronic drive unit of claim 7, wherein the cooling passage is integrally arranged in the stator and sealed via the sealing laminations.

9. The electronic drive unit of claim 7, wherein the sealing laminations are a part of a stator lamination stack, the sealing laminations sandwiched between the first end-winding and the stator.

10. The electronic drive unit of claim 7, wherein the sealing laminations extend into the housing.

11. The electronic drive unit of claim 7, wherein the sealing laminations are curved from the stator to the housing.

12. An electronic drive unit, comprising:
a housing;
a stator arranged in the housing and comprising a cooling passage;
a plurality of laminations sandwiched between a first end-winding and a second end-winding and side surfaces arranged at opposite axial ends of the stator, wherein the plurality of laminations is further physically coupled to the housing; wherein
a lamination of the plurality of laminations seals the cooling passage forming a collection channel directly between the housing and the stator, the collecting channel including an opening configured to jet oil from the collection channel of the cooling passage onto the first end-winding, wherein a portion of the lamination shaping the collection channel extends in a direction normal to a side surface of the stator, and wherein the collection channel is arranged at extreme ends of the cooling passage adjacent to the first end-winding and the second end-winding and shaped via the portion of the lamination, the lamination in face-sharing contact with the housing and sandwiched between an end-winding and the stator, and
the plurality of laminations comprises only a single opening per end-winding, wherein for each of the end-windings, the single opening is positioned radially between the end-winding and an outer circumference of the housing and is configured to jet coolant from the cooling passage to the first and second end-windings.

13. The electronic drive unit of claim 12, wherein the plurality of laminations extends in a first direction parallel to a direction of oil flow through the cooling passage and a second direction normal to the direction of oil flow.

14. The electronic drive unit of claim 13, wherein a portion of the plurality of laminations extending in the first direction is physically coupled to the housing and a portion of the plurality of laminations extending in the second direction is sandwiched between either the first end-winding or the second end-winding and the stator.

15. The electronic drive unit of claim 13, wherein the openings of the plurality of laminations jet oil in a direction normal to the first end-winding and the second end-winding.

* * * * *